US006302679B1

United States Patent
Seely

(10) Patent No.: US 6,302,679 B1
(45) Date of Patent: Oct. 16, 2001

(54) HONEYCOMB EXTRUSION DIE

(75) Inventor: Richard L. Seely, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 08/337,252

(22) Filed: Nov. 10, 1994

(51) Int. Cl.$^7$ .................................................. B29C 47/12
(52) U.S. Cl. .................... 425/380; 264/177.12; 425/461; 425/467
(58) Field of Search ...................... 425/380, 461, 425/463, 464, 467; 264/177.11, 177.12, 211.11; 29/557, 558

(56) References Cited

U.S. PATENT DOCUMENTS

| | | | |
|---|---|---|---|
| 3,905,743 | * | 9/1975 | Bagley ................................. 425/464 |
| 4,527,035 | | 7/1985 | Majestic . |
| 5,286,323 | * | 2/1994 | Bagley ................................. 425/464 |
| 5,308,556 | | 5/1994 | Bagley . |
| 5,320,721 | | 6/1994 | Peters . |
| 5,320,904 | | 6/1994 | Mitchell . |

FOREIGN PATENT DOCUMENTS 0 165 520    12/1985   (EP) .

OTHER PUBLICATIONS

"Density and Microstructure Control in a Martensitic Stainless Steel Through enhanced Sintering", C. Toennes, R. M. German, *Powder Metallurgy*, vol. 24, No. 3, 1992, pp. 151–157.
Alloydata, Carpenter 636 (No. 422) , Carpenter Technology Corporation, Carpenter Steel Division.
"Steel Billets Produced by New P/M Process Using Horizontal Gas Atomization", *Industrial Heating*, 49 (May 1982), p. 33–36.
"Stainless Steel", McGraw–Hill Encyclopedia of Science & Technology, McGraw–Hill Book Company, 6th Edition, 17 SOR–SUR, pp. 300–304, 1987.
P/M Design Guidebook, published by the Metal Powder Industries Federation, (1983) Princeton, NJ.

* cited by examiner

Primary Examiner—Nam Nguyen
Assistant Examiner—Joseph Leyson
(74) Attorney, Agent, or Firm—Kees van der Sterre

(57) ABSTRACT

Honeycomb extrusion dies for the extrusion of honeycomb ceramics of high cell density and reduced cell wall thickness are machined from fully consolidated powder metallurgy (P/M) stainless steels, providing dies with reduced feed hole roughness, improved feed hole straightness, and superior discharge slot finish, with the result that significantly enhanced extrusion performance and higher quality honeycomb extrusions are realized.

5 Claims, 1 Drawing Sheet

HONEYCOMB EXTRUSION DIE

BACKGROUND OF THE INVENTION

The present invention relates to extrusion dies for forming thin-walled honeycomb structures from extrudable materials. More particularly, the invention relates to extrusion dies offering improved utility for the extrusion of thin-walled high-cell-density ceramic and metallic honeycombs.

In the manufacture of ceramic honeycombs, particulate mineral batch materials are dispersed in an appropriate vehicle to form a plasticized powder batch, and the batch is forced through a honeycomb die to provide extruded green bodies of complex honeycomb shape which are then dried and fired. Thin-walled ceramic honeycomb structures thus produced display utility in a variety of applications. For example, such structures are used as substrates for the support of catalysts in automotive exhaust gas treatment systems, as well as for other catalyst carriers, filter bodies, and thermal regenerators or heat exchangers. Metallic honeycombs of similar configuration have been used as gas heaters.

As the art of honeycomb extrusion has advanced, honeycombs with finer and finer cell structures and thinner cell walls have been developed. The production of these finer honeycombs requires that extrusion dies with finer structure be used. Dies used for the extrusion of ceramic honeycombs are typically machined metal plates or blocks having shallow, criss-crossing and interconnecting discharge slots on the downstream or outlet face of the die from which the plasticized batch emerges and through which, during emergence of the batch, the webs or sidewalls of the cells of the honeycomb structure are formed. To supply the batch material to the discharge slots, feed holes communicating with the slots are provided in the opposite or inlet face of the die.

To provide finer honeycombs with higher cell densities (more cells per unit area) and thinner cell walls, the discharge slots and feedholes must of course be formed closer together and be smaller in size. For advanced ceramic honeycomb products, the objectives are to achieve cell densities exceeding 600 cells/in$^2$ and cell walls below about 200 $\mu$m in thickness.

To achieve these dimensions, slot and feedhole machining to very close tolerances is required. Meeting such tolerances has required the use of non-traditional machining processes such as electrochemical machining (ECM) and wire electrical discharge machining (EDM). EDM is the preferred process for generating the discharge slots and ECM is typically used for producing the precise arrays of small feedholes needed to supply the discharge slots.

In the prior art, extrusion dies for the manufacture of ceramic honeycombs have been formed of tool steels or stainless steels. Stainless steels are harder to machine but offer significant advantages for honeycomb die fabrication because they offer a corrosion resistant medium which can withstand relatively high stresses and attack by aqueous media. In addition, many stainless steels can be wear-coated with hard surfacing materials such as carbides and nitrides. Such coatings significantly enhance the ability of the die to resist wear from the abrasive ceramic powder batch materials extruded therethrough.

The difficulty of shaping these very hard stainless steel materials has led to the suggestion of alternative extrusion die manufacturing strategies, particularly where complex feedhole shapes are desired. Thus U.S. Pat. No. 5,308,556, for example, discloses a method of forming an extrusion die from a powder, wherein a powder preform for the die, typically of ceramic composition but optionally of metal, is at least partially machined while in a porous and unconsolidated (green or chalk-hard) state. The shaping of consolidated die blank materials is also mentioned, although specific materials useful in that procedure are not actually described or discussed.

Unfortunately powder-formed dies made as described in the above patent have not yet been proven for use in the production of high-cell-density, thin-walled honeycomb structures. One problem with the described approach is the difficulty of maintaining high dimensional precision in feedholes and/or discharge slots made in unconsolidated materials during the high-shrinkage process of consolidating them to useful densities. Thus the materials of choice for the fabrication of advanced honeycomb extrusion dies are still wrought stainless steels and tool steels.

Descriptions of the use of EDM and ECM for the fabrication of stainless steel extrusion dies are found in the patent literature. U.S. Pat. Nos. 5,320,721 and 5,322,599, for example, describe the application of ECM processes to the machining of die feedholes, while U.S. Pat. No. 4,527,035 documents the application of wire EDM to the machining of discharge slots in the outlet faces of the dies.

In principle, the finer hole and slot dimensions needed for advanced honeycombs can be reached with ECM and EDM machining techniques. In practice, however, the resulting dies do not demonstrate the expected extrusion performance. Forming defects including missing webs (interruptions in the formation of the cell walls of the honeycomb) and swollen webs (wall segments of excessive thickness), are often observed, as is unacceptable twisting or turning ("bowing") of the extruded material as it exits the extrusion die. In general, these defects are usually attributed to defects in design or finish of the extrusion dies.

It would be desirable to develop a die or die machining procedure for making dies for the extrusion of very fine honeycomb structures which would permit the extrusion of honeycombs with thinner walls and/or higher cell counts at yields as high or higher than present honeycomb extrusion processes.

It would also be desirable to develop a die which would permit the extrusion of less advanced ceramic honeycombs at higher yields and in higher quality. Yet, any material selected for this application would have to be sufficiently strong to handle the relatively large extrusion pressures required for fine honeycomb extrusion, and sufficiently durable and wear resistant to resist the abrasive effects of presently used ceramic powder batches.

SUMMARY OF THE INVENTION

The present invention is based on the finding that fully consolidated powder-formed stainless steels, that is stainless steels formed from steel powders which have been consolidated to a dense, substantially non-porous state, provide much better die blank materials for the fabrication of honeycomb extrusion dies than do conventional or wrought stainless steels of similar composition. Die blanks formed from these powder-formed or so-called P/M (powder metallurgy) stainless steels, if of appropriate composition and density, have been found to yield dies offering significant improvements in surface finish and extrusion performance. These improvements are evident both from a study of the dies themselves and from the quality of the extruded honeycombs. Improvements are seen not only for advanced honeycomb designs of high cell count and fine wall structure, but for current honeycomb designs as well.

In a first aspect then, the present invention comprises an improvement in a method for making a honeycomb extrusion die from stainless steel. As is conventional, that method includes the steps of forming feedholes and discharge slots in the inlet and outlet faces of the die. However, in accordance with the invention, the stainless steel die blank selected for fabrication of the die is a blank made of a powder-formed stainless steel which has been consolidated to a dense non-porous state.

Powder-formed or P/M stainless steels are well known in the metallurgical arts, but have been used mainly for the forming of steel parts of complex configuration. Using P/M technology, such parts can be formed to near net shape by pressing metal powders into compacts and then consolidating. The aim, of course, is to avoid as much as possible the need for machining.

Similarly, porosity is a desired attribute of some P/M metals, with bending strength being of relatively little importance. Porosity is of particular interest for applications such as bearings, where infiltration of the metal matrix with lubricous materials is desired.

The present invention does not seek to avoid the machining of P/M stainless steel, but instead to select such a steel which is sufficiently strong, homogeneous and dense to provide a durable die blank material which can be machined to very high dimensional tolerances and a surface finish substantially free of defects on a micron scale. Likewise, porosity in the steel is to be avoided, both for reasons of surface finish and because die steels must exhibit high strength in order to resist extrusion pressures without deformation.

Powder-formed stainless steels have now been identified which meet all of these requirements, and which in addition are sufficiently improved in homogeneity and free of inclusions and other crystalline matrix defects as to provide a large and unanticipated improvement in machinability. The invention thus further includes a honeycomb extrusion die formed of such a material, wherein the die blank from which the die has been fabricated is a fully consolidated powder-formed stainless steel blank substantially free of microstructural porosity and intermetallic inclusions. Such a die offers all of the advantages of conventional stainless steel dies in terms of strength, corrosion resistance and wear coatability, but in addition demonstrates superior extrusion performance in terms of product quality and process stability.

DESCRIPTION OF THE DRAWINGS

The invention may be further understood by reference to the drawings, wherein.

DETAILED DESCRIPTION

Figure 1:
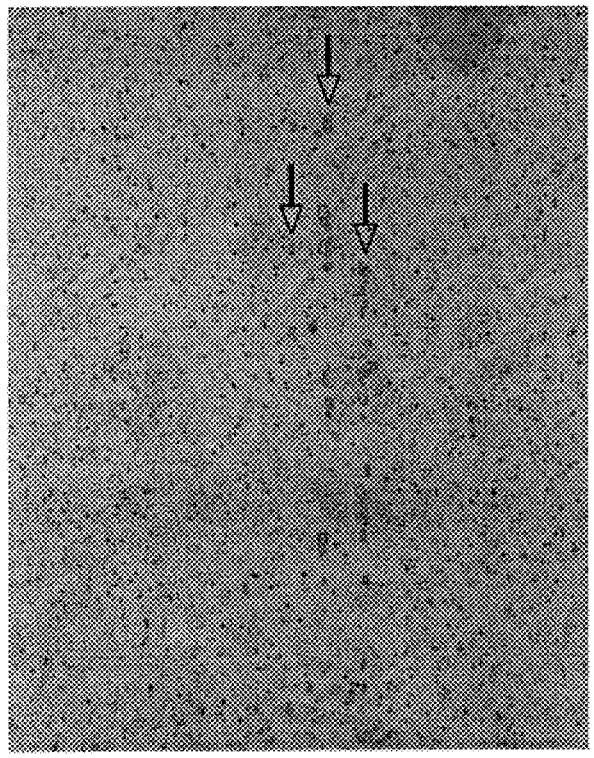
FIG. 1 is an electron photomicrograph of a section of a wrought steel die blank material of the prior art.

While the variations in extrusion efficiency observed in attempting to extrude fine honeycomb structures in the prior art were generally attributed to variations in the extrusion dies, the factors which differentiated dies exhibiting good extrusion behavior from dies exhibiting poor behavior were not well understood. In the course of developing dies with finer feedhole and discharge slot configurations, these variations assumed much greater importance and had to be addressed.

In the ECM process typically used for drilling the very fine feedhole arrays in stainless steel die blanks, a frequent problem had been bent drilling tubes. Such bending produced angling or "spearing" of the feedhole away from the intended line of drilling, with the result that some of the feedholes failed to properly intersect with the discharge slots. In the machining of discharge slots by the EDM processes, the use of finer wires to achieve finer slot patterns resulted in a higher incidence of wire breakage and uneven slot widths in the final slot pattern.

Analysis of die blanks exhibiting significant machining problems did not identify any significant departures from specifications for targeted chemical composition and physical properties. In fact, stainless steels of the same AISI type but from different lots, and even from different locations on a single length of bar stock from a single lot, produced widely varying results when subjected to drilling and slotting.

One variable which did associate with machining problems, however, was machined surface roughness. Analysis of a large number of samples from different bar stock locations and different lots of steel of the same type indicated that there was a strong correlation between feedhole drilling defects and the surface roughness of machined surfaces of the feedholes. In one study, conducted on AISI Type 450 stainless steel from a commercial source, machined hole surface roughness values (Ra) were 35–40 microinches in some bar sections and 60–65 microinches in other sections. Dies made from the blanks with higher machined surface roughness were found much more likely to produce speared feedholes and/or extrusions which bowed away from or twisted about the line of extrusion.

Microscopic examinations of steel samples undertaken in an effort to more completely understand these effects revealed that the steels with higher surface roughness had higher levels of intermetallic inclusions in the steel matrix. These inclusions appeared in many cases to have been rolled out into long "stringers" during the steel forging process, increasing the possibility that the inclusions would intersect a feedhole or a slot.

While not yet fully understood, these inclusions appear to be rich in niobium, perhaps consisting largely of niobium carbide. Such inclusions would not be readily dissolved or eroded during electrochemical drilling processes, and could therefore be at least partly responsible for effects such as drilling tube deflections and higher surface roughness in selected feedholes, as well as discharge slot irregularities and wire breakage during the wire EDM slotting process.

The above findings suggested that the majority of the feedhole and discharge slot defects observed in dies fabricated from stainless steels are attributable not simply to wire EDM and ECM machining processing limitations and/or variability, but at least in part to microstructural defects in the stainless steels used to form the dies. Such defects although small, could promote machining variations which could be relatively large on the scale of the feedhole and discharge slot dimensions being required.

Regardless of theory, in accordance with the present invention the reduction or substantial elimination of the above-described machining defects is achieved through the substitution of fully consolidated powder-formed stainless steel for the wrought steel stock conventionally used for the die blanks. These powder-formed consolidated stainless steels are apparently sufficiently improved in homogeneity and sufficiently free of inclusions and other crystalline matrix defects as to provide a large improvement in the smoothness and uniformity of the feedholes and discharge slots in these dies.

Figure 2:
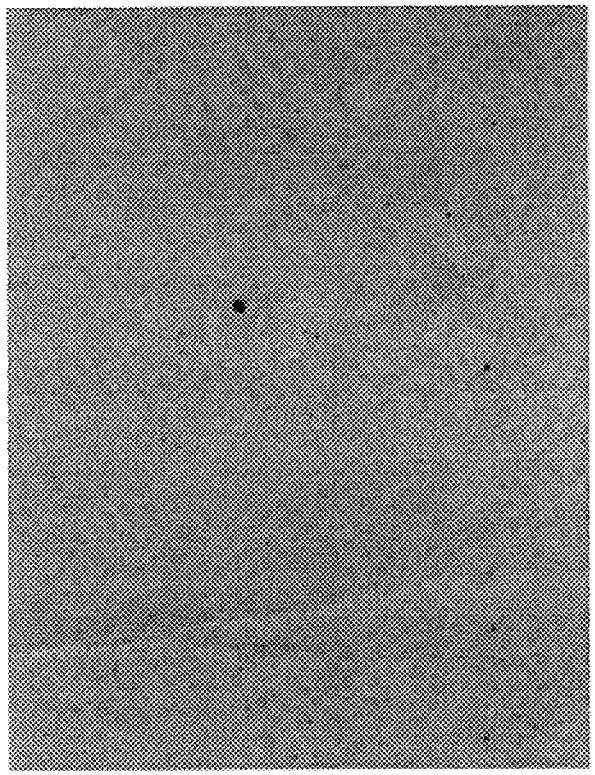
FIG. 2 is an electron photomicrograph of a section of a P/M steel die blank material provided in accordance with the invention.

A comparison of the microstructure of wrought and powder-formed stainless steel samples useful for the fabrication of honeycomb extrusion dies is provided in FIGS. 1 and 2 of the drawings. FIG. 1 is an electron photomicrograph of a conventional or wrought steel sample, taken at a magnification of 400x. The sample shown is a wrought AISI Type 450 stainless steel, polished with one micron diamond abrasive and etched in a 4% Picral solution with HCL to reveal the microstructure of the sample.

As is evident from this photomicrograph, the steel of FIG. 1 includes a substantial number of intermetallic inclusions in the steel matrix, with several concentrations or clusters of such inclusions being indicated by the arrows. As suggested above, these inclusions can form elongated or line defects in the structure, called "stringers", which are now thought to interfere with chemical and electrical machining processes.

FIG. 2 of the drawing is a similar electron photomicrograph taken of a powder-formed AISI Type 422 stainless steel. Again, the surface of the sample is shown at a magnification of 400x after polishing and etching with 4% Picral in HCL. In contrast to the microstructure of FIG. 1, the etched microstructure in this photomicrograph is substantially free of the intermetallic inclusions seen in the wrought sample of the same composition. In addition, though formed from a powder, it is substantially free of microstructural porosity, even at magnifications up to 1000x. The use of a fully consolidated P/M stainless steel such as shown in FIG. 2 for the fabrication of a honeycomb extrusion die is described in the following illustrative example.

EXAMPLE

A plate formed of P/M stainless steel is selected for use as an extrusion die blank. The steel employed is an AISI Type 422 stainless steel, commercially available in bar form as Carpenter 636 stainless steel from Carpenter Technology Corporation, Reading, Pa. This steel is manufactured by atomization of a molten stainless steel stream in a high velocity gas jet to a fine powder, the fine (325 mesh) powder then being consolidated by hot isostatic pressing into large steel billets. The billets are then cogged and rolled to provide steel bar and plate stock.

To fabricate a die from the steel plate thus provided, an array of fine feed holes is first drilled into one surface of the plate by the electrochemical machining (ECM) process. The drilling process used is the same process as used conventionally for drilling wrought Type 422 stainless steel, and the result is the formation of an array of fine feed holes in the drilled surface of the plate.

After the plate has been drilled, it is turned over and the surface opposite the feed holes is slotted to provide a discharge slot array in the opposite surface connecting with the previously drilled feed hole array. The discharge slots are machined into the steel by wire electrical discharge machining (EDM). Again, the EDM process used is the same as is used to machine wrought Type 422 stainless steel for this purpose.

Both the feed hole drilling and discharge slot machining of this P/M blank are accomplished with relative ease. The incidence of rough or speared feed holes and EDM wire breaks is significantly reduced when compared with machining results for the same processes as applied to wrought stainless steels.

For example, the experience with wrought stainless steel, most typically Type 450 stainless steel as shown in FIG. 1 of the drawing, is that defective feed holes, including holes with excessive roughness and/or poor intersection with the discharge slots, typically comprise 20% to 30% of the holes drilled by the ECM process. In contrast, recent experience with fully consolidated P/M stainless steels, such as the P/M Type 422 steel shown in FIG. 2 of the drawing, is that excessively rough, speared or poorly intersecting feedholes are virtually eliminated during the ECM drilling of the P/M materials.

Similarly, EDM wire breaks encountered when slotting wrought stainless steels, using for example 5-mil and 6-mil wire of the kind typically used for slotting honeycomb extrusion dies, generally average at least 20 breaks during the slotting of die blanks of the size currently used for the production of automotive catalyst converter substrates. This contrasts markedly with recent data collected on the slotting of similar die blanks of powder-formed stainless steel as in the Example. In latter case fewer than two wire breaks are typically seen during the EDM slotting of P/M blanks of the same size.

The effects of these improvements in die quality on the extrusion of ceramic honeycombs is significant. Most importantly, the incidence of "bow" as a new die is introduced into the extrusion process can be significantly reduced by employing P/M stainless steel as the die blank material. In fact, the percentage of new dies requiring polishing or honing to correct bow problems can be reduced by a factor of at least 4 by substituting powder-formed stainless steel blanks for wrought stainless steel blanks in the die fabrication process.

At present, the particular composition of the powder-formed stainless steel selected for use as a die blank material in accordance with the invention is not considered to be critical. Thus, the steel type selected from among the available P/M sources may be chosen primarily on the basis of factors such as strength, wear coatability, hardness, and the like.

The presently preferred powder-formed stainless steels for extrusion die fabrication are the chromium-containing ferritic or martensitic 400 series stainless steels, specific examples of such steels being Types 450 and 422 steels. At present, the particularly preferred steel is P/M Type 422 stainless steel.

Depending on the particular material being extruded and/or differing requirements for wear coating or other die hardening procedures, other stainless steels could alternatively be employed. Examples of such other of steels, considered excellent candidates for extrusion die use if sourced from powdered steel, are the chromium- and nickel-containing austenitic or precipitation-hardenable steels. An example of such a steel is Type 17-4PH (AISI Type 630) precipitation-hardenable steel. Even durable non-steel alloys, including nickel alloys such as certain of the Inconel™ alloys, could constitute excellent die blank materials if sourced from powders and consolidated to dense void-free blanks.

Key requirements of any of these candidate extrusion die materials are that they be available in a fully consolidated form which is substantially free of microstructural porosity, resistant to corrosion, and of sufficient strength to withstand the stresses of the extrusion process for which they are intended. Additionally important for some applications are the thermal processing characteristics of the metal, since thermal stability improves wear-coating compatibility, and thus the suitability of the die material for ceramic batch extrusion applications.

I claim:

1. A honeycomb extrusion die formed by the process of:

selecting a die blank composed of a fully consolidated powder-formed stainless steel, the stainless steel having been manufactured by hot isostatic pressing an atomized stainless steel powder;

forming feedholes in a first surface of the die blank by electrochemical machining; and forming discharge slots in an opposite surface of the die blank.

2. An extrusion die in accordance with claim 1 wherein the steel die blank is substantially free of intermetallic inclusions and microstructural porosity.

3. An extrusion die in accordance with claim 1 which is formed of a powder-formed stainless steel selected from the group consisting of ferritic and martensitic stainless steels.

4. An extrusion die in accordance with claim 1 which is formed of a powder-formed stainless steel selected from the group consisting of austenitic and precipitation hardenable stainless steels.

5. An extrusion die in accordance with claim 1 which is formed of powder-formed AISI Type 422 stainless steel.

* * * * *